United States Patent [19]

Sasaki et al.

[11] Patent Number: 4,751,379
[45] Date of Patent: Jun. 14, 1988

[54] TOUCH PANEL COORDINATE INPUT DEVICE HAVING LIGHT FILTER

[75] Inventors: Hiroaki Sasaki; Kazuo Hasegawa; Junichi Ouchi, all of Furukawa, Japan

[73] Assignee: Alps Electric Co., Ltd., Japan

[21] Appl. No.: 914,283

[22] Filed: Oct. 2, 1986

[30] Foreign Application Priority Data

Oct. 4, 1985 [JP] Japan ............................ 60-151499[U]

[51] Int. Cl.⁴ .................................................. G01V 9/04
[52] U.S. Cl. ..................................... 250/221; 340/556
[58] Field of Search ............................. 250/221, 222.1; 340/555, 556, 557, 706, 709

[56] References Cited

U.S. PATENT DOCUMENTS 4,672,364 6/1987 Lucas .................................. 250/221

Primary Examiner—David C. Nelms
Assistant Examiner—Jessie Ruoff
Attorney, Agent, or Firm—Guy W. Shoup

[57] ABSTRACT

A photodetection type coordinate input device includes a frame having a substantially rectangular opening formed in the center, a light-emitting element array composed of a plurality of light-emitting elements disposed along each of the two sides of the opening of the frame, a light-receiving element array composed of a plurality of light-receiving elements disposed along each of the two sides which respectively oppose the first two sides, and a filter provided in a part or the whole area of the opening and adapted to transmit desired light alone. The opening of the frame is disposed in front of a display to form a plurality of optical paths by pairs of light-emitting and -receiving elements, respectively, in front of the display screen of the display, and a position at which optical paths are blocked is detected to specify a coordinate position on the display screen, thereby inputting the coordinate position. The coordinate input device is provided with a recess for blocking the propagation of light toward the light-receiving element side. The recess is disposed in a region within the filter section which is closer to at least the light-receiving element side than a position which is located on the downstream side in a direction in which the light emitted from the light-emitting elements travels and which position is at a mid point between the light-emitting and -receiving elements.

6 Claims, 3 Drawing Sheets

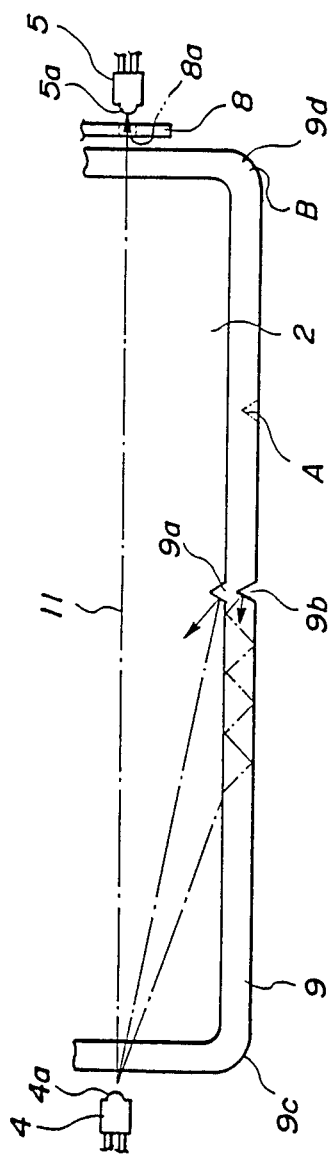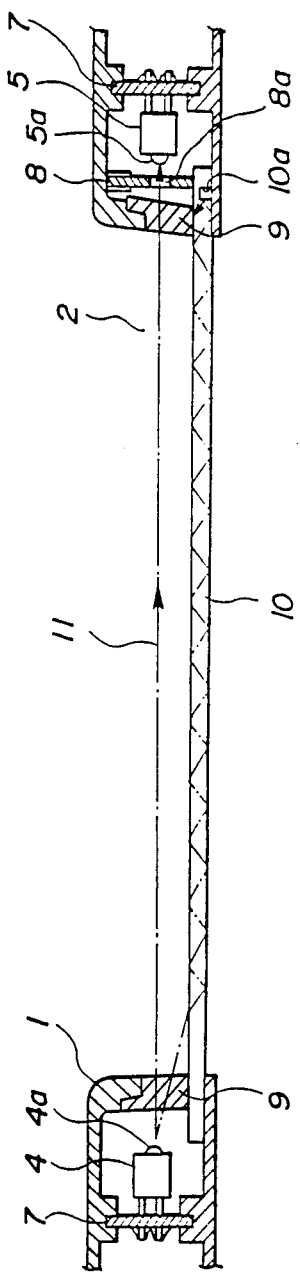

TOUCH PANEL COORDINATE INPUT DEVICE HAVING LIGHT FILTER

BACKGROUND OF THE INVENTION

1. Field of the Invention

The present invention relates to a photodetection type coordinate input device attached to the front side of a display and adapted to detect a coordinate position with respect to the display and input the detected coordinate position to a computer. More particularly, the present invention pertains to a coordinate input device which is so designed that it is prevented from malfunctioning.

2. Description of the Related Art

Among various types of coordinate input devices designed to manually input a coordinate position to a computer, photodetection type coordinate input devices in which a coordinate position can be specified simply by pressing any position on the front side of a display with a finger or the like have attracted attention recently from the viewpoint of reliability and operability.

One example of heretofore known photodetection type coordinate input device is shown in FIGS. 3 to 5, in which: FIG. 3 is a perspective view showing one example in which a photodetection type coordinate input device is attached to the front side of a display; FIG. 4 is a fragmentary sectional view showing an essential part on the light-receiving element side of the coordinate input device; and FIG. 5 is a rear view showing the internal structure of the coordinate input device with its rear panel removed.

This coordinate input device is composed of the following major elements: a frame 1 shaped such as to have a substantially rectangular configuration and having an opening 2 in the center; a plurality of pairs of light-emitting elements 4 such as LEDs and light-receiving elements 5 such as phototransistors, which are respectively disposed on the opposing sides of a display 3 constituted by a CRT or the like on the reverse side of the frame 1, that is, on the side of the display 3 which is closer to the display screen 3a thereof; and an arithmetic unit 6 adapted to detect a position at which optical paths 11 are blocked from the pairs of light-emitting elements 4 and light-receiving elements 5 and to input the detected coordinate position to the host computer side. The light-emitting elements 4 and the light-receiving elements 5 are soldered at their terminals to boards 7 mounted on the frame 1 in such a manner that the light-emitting portion 4a of one light-emitting element 4 and the light-receiving portion 5a of the light-receiving element 5 which is paired with this light-emitting element 4 oppose each other.

In the opening 2 is provided an operation panel 10 constituted by a VDT (Video Display Terminal) filter for making the display screen 3a of the display 3 easy to see and for preventing the screen 3a from becoming stained and also protecting the screen 3a from adhesion of dust or the like. In front of the arrayed light-receiving elements 5 is disposed a light-shielding plate 8 provided with light-transmitting bores 8a each having a predetermined area and depth which are so set that one light-receiving element 5 can receive only the incident light emitted from the paired light-emitting element 4. In addition, an infrared filter 9 in the shape of a rectangular frame which serves as a visible light-removing filter is provided along the entire periphery of the opening 2 so that the filter 9 is disposed in front of the light-shielding plates 8 and the light-emitting and -receiving elements 4 and 5. In other words, the respective front sides of the arrayed light-receiving elements 5 which are disposed in a substantially L-shape and the respective front sides of the arrayed light-emitting elements 4 which are also disposed in a substantially L-shape oppose the outer wall surfaces, respectively, of the infrared filter 9 in the shape of a rectangular frame. Accordingly, invisible optical paths 11 are formed through the infrared filter 9 on the front side of the operation panel 10, that is, the side of the panel 10 which is remote from the display screen 3a.

In detection of a coordinate position, as shown in FIGS. 3 and 5, for example, a position on the operation panel 10 which corresponds to a position on the display screen 3a that is desired to be input is pressed with a finger 12. In consequence, among the optical paths 11 formed along the surface of the panel 10, the optical paths 11 which would otherwise pass through the position of the finger 12 are blocked by the finger 12. Accordingly, by sequentially turning ON the light-emitting elements 4 so as to scan over the coordinates, it is possible to detect a blocked optical path 11 from the corresponding light-receiving element 5 in each of the directions of x and y. The blocked optical paths 11 are identified by the arithmetic unit 6, and the corresponding coordinate position is output to the host computer (not shown).

The above-described photodetection type coordinate input device suffers, however, from the following disadvantage. Undesirable light particularly from a light-emitting element 4 which is located near a corner of the opening 2 may be reflected from the approximately central portion of a nearby inner wall surface of the infrared filter 9 to reach the light-receiving portion 5a of a light-receiving element 5. In consequence, there is a fear that, even when a position on the operation panel 10 near the peripheral edge of the opening 2 is pressed with a finger 12, the blockage of the optical paths 11 may not be detected, and this leads to malfunction. To overcome such problem, an arrangement has heretofore been proposed in which a projection is provided at an approximate center of each inner wall surface of the infrared filter 9 so as to prevent any reflected light from reaching the light-receiving portion 5a of a light-receiving element 5. In practice, however, such malfunction may be caused not only by the reflection of light from an inner wall surface of the infrared filter 9 but also by the arrival at the light-receiving portion 5a of the light which propagates through the filter section, that is, the inside of the infrared filter 9 or the inside of the operation panel 10. For this reason, the above-described conventional proposition is not a satisfactory malfunction preventing measure. In addition, when relatively strong ambient light from a light source such as the sun or an incandescent lamp enters the filter section, the incident light may propagate through the inside of the infrared filter 9 or the inside of the operation panel 10 to reach the light-receiving portion 5a, thus causing malfunction.

SUMMARY OF THE INVENTION

In view of the above-described circumstances, it is an object of the present invention to provide a coordinate input device in which any light which propagates through the inside of the visible light-removing filter or the inside of the operation panel is prevented from entering the light-receiving element side, thereby improving the reliability.

To this end, the present invention provides, in a photodetection type coordinate input device having a frame having a substantially rectangular opening formed in the center, a light-emitting element array composed of a plurality of light-emitting elements disposed along each of the two sides of the opening of the frame, a light-receiving element array composed of a plurality of light-receiving elements disposed along each of the two sides which respectively oppose the first two sides, and a filter provided in a part or the whole area of the opening and adapted to transmit desired light alone, wherein the opening of the frame is disposed in front of a display to form a plurality of optical paths by pairs of light-emitting and -receiving elements, respectively, in front of the display screen of the display, and a position at which optical paths are blocked is detected to specify a coordinate position on the display screen, thereby inputting the coordinate position, the improvement which comprises having a recess for blocking the propagation of light toward the light-receiving element side, the recess being provided in a portion of the filter which is closer to at least the light-receiving element side and on the downstream side in a direction in which the light emitted from the light-emitting elements travels. By virtue of this arrangement, there is no fear that undesirable light enters a light-receiving element from an optical path other than a predetermined optical path formed by a given pair of light-emitting and -receiving elements.

BRIEF DESCRIPTION OF THE DRAWINGS

FIGS. 1 and 2 are views used to explain one embodiment of the present invention, in which:

FIG. 1 is a fragmentary front view of an essential part of the coordinate input device; and FIG. 2 is a fragmentary sectional view of the essential part; and FIGS. 3 to 5 are views used to explain a prior art, in which:

FIG. 3 is a perspective view of a prior art coordinate input device attached to the front side of a display screen;

FIG. 4 is a fragmentary sectional view of an essential part of the light-receiving element side of the device; and FIG. 5 being a rear view schematically showing the internal structure of the prior art coordinate input device.

DESCRIPTION OF THE PREFERRED EMBODIMENT

One embodiment of the present invention will be described hereinunder with reference to the accompanying drawings.

Figure 3:
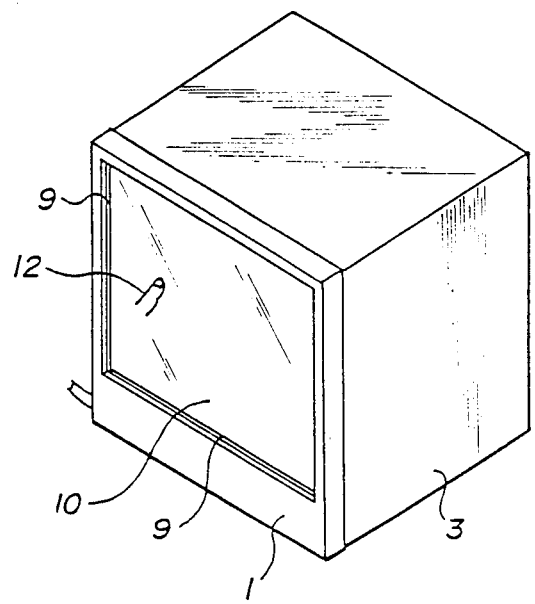
Figure 4:
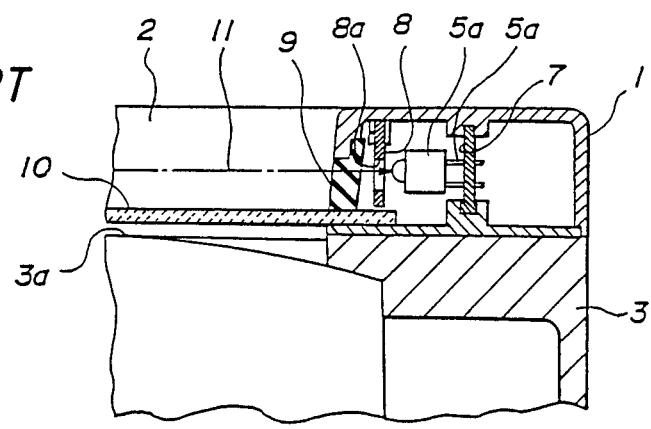
Figure 5:
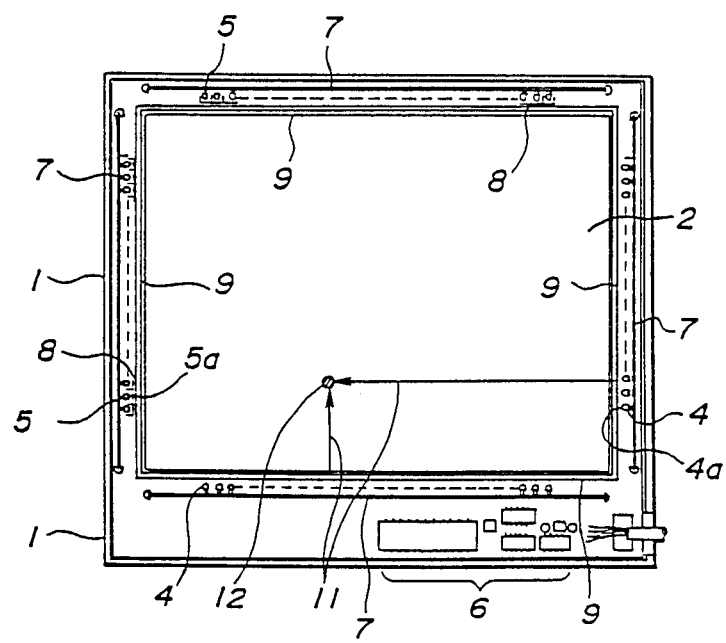

FIGS. 1 and 2 are views used to explain one embodiment of the present invention. FIG. 1 is a fragmentary front view of an essential part of a coordinate input device, and FIG. 2 is a fragmentary sectional view of the essential part. In these figures, portions or members which correspond to those shown in FIGS. 3 to 5 are denoted by the same reference numerals.

Referring to FIG. 1, the infrared filter 9 serving as a visible light-removing filter is disposed in front of the light-emitting element 4 and the light-shielding plate 8, the filter 9 having the shape of a substantially rectangular frame. Thus, an invisible optical path 11 is formed between the light-emitting portion 4a of the light-emitting element 4 and the light-receiving portion 5a of the light-receiving element 5 through the infrared filter 9. In addition, a projection 9a is provided in the center of each of the inner wall surfaces of the filter 9, so that the projection 9a prevents the occurrence of an undesirable situation in which the light emitted from the light-emitting portion 4a is reflected from the inner wall surface of the infrared filter 9 to reach the light-receiving portion 5a through the light-transmitting bore 8a. Further, a groove-like recess 9b is provided in the center of each of the outer wall surfaces of the infrared filter 9, that is, on the side of the filter 9 which is opposite to the projection 9a, so that the recess 9b prevents an undesirable situation in which the light emitted from the light-emitting portion 4a enters the infrared filter 9 and then propagates through the inside of the filter 9 to reach the light-receiving portion 5a.

In other words, although no malfunction preventing measure has heretofore been taken as to the light from the light-emitting portion 4a which enters the infrared filter 9 and propagates toward the light-receiving element 5 through the inside of the filter 9, the recess 9b is provided in the present invention to obstruct the passage of the light which propagates through the inside of the infrared filter 9 so that it is difficult for this light to reach the light-receiving portion 5a thereby suppressing the occurrence of malfunction.

It should be noted that, as shown by the chain line A in FIG. 1, the recess 9b may be provided at a position on each of the outer wall surfaces of the infrared filter 9 on the side thereof which is closer to the light-receiving element side corner 9d than the light-emitting element side corner 9c, that is, at a position on each of the outer wall surfaces which is closer to any of the three corners of the visible light-removing filter than the corner thereof which is adjacent to only the arrays of light-emitting elements. The recess 9b may be provided in the light-receiving element side corner 9d of each of the outer wall surfaces of the infrared filter 9 as shown by the chain line B in FIG. 1. In this case, a total number of recesses 9b provided in the filter 9 is three.

Referring next to FIG. 2, the operation panel 10 is constituted by a VDT filter in the shape of a plate and provided in the opening 2 of the frame 1. The panel 10 is disposed in front of the display screen of a display (not shown) for the purpose of making the display screen easy to see and of preventing the screen from becoming stained as well as protecting it from adhesion of dust or the like. A groove-like recess 10a is provided in the reverse surface of the operation panel 10 near the light-receiving element 5 in such a manner that the recess 10a extends in substantially parallel to the light-receiving element array which includes the light-receiving element 5. Accordingly, the light from the light-emitting portion 4a of the light-emitting element 4 which enters the operation panel 10 and which propagates toward the light-receiving element 5 through the inside of the panel 10 is obstructed by the recess 10a so that it is difficult for this light to reach the light-receiving portion 5a, thereby suppressing the occurrence of malfunction. In addition, even when relatively strong light which is emitted from the sun or an incandescent lamp enters the device and propagates through the inside of the infrared filter 9 or the inside of the operation panel 10, this light is blocked by the recesses 9a, 9b, and 10a, whereby the occurrence of malfunction is suppressed.

Although in the above-described embodiment the recesses (grooves) for blocking the propagation of light are provided at their respective predetermined positions on the infrared filter 9 or the operation panel 10, there may be cases where it suffices to provide the recesses on either the filter 9 or the panel 10 depending upon the kind of the display 3 or the structure of the frame 1. For example, in a device in which the surface of the frame 1 and the display screen 3a are so spaced apart from each other that the screen 3a can be seen only in a specific direction, it is unnecessary to provide the infrared filter 9 for concealing devices or elements inside the frame 1. In such a case, it suffices to provide recesses only at predetermined positions on the operation panel 10 to obtain advantageous effects similar to those offered by the above-described embodiment.

In the case where, for example, an LCD (Liquid Crystal Display) is employed as the display 3 and, therefore, even when an operator sees the display screen 3a directly, his eyes do not become fatigued as in the case of employing a CRT as the screen 3a, it is unnecessary to provide an operation panel 10 such as a VDT filter. In such a case, it suffices to provide recesses only at predetermined positions on the infrared filter 9 to obtain advantageous effects similar to those offered by the above-described embodiment.

As has been described above, according to the present invention, a recess for blocking the propagation of light is provided in a filter section additionally provided in the opening of the frame located on the front side of the display screen so that the recess is disposed in a region within the filter section which is closer to at least the light-receiving elements from a position which is located on the downstream side in a direction in which the light emitted from the light-emitting elements travels and which position is at a mid point between the light-emitting and receiving elements. It is therefore possible to effectively suppress the intrusion into the light-receiving element side of the light which propagates through the inside of the infrared filter or the inside of the operation panel. Thus, it is possible to prevent the occurrence of malfunction of the coordinate input device and to improve the reliability.

What is claimed is:

1. In a photodetection type coordinate input device having a rectangular frame around a touch panel area, a light-emitting element array composed of a plurality of light-emitting elements disposed in rows on two adjacent sides of the frame, a light-receiving element array composed of a plurality of light-receiving elements disposed in rows on two other adjacent sides of the frame each of which faces opposite a respective one of the first-mentioned two sides, wherein each light-emitting element of the ligh-emitting element array is directed toward an opposing light-receiving element of the light-receiving element array across the touch panel area and forms a photodetection element pair therewith, and a filter provided in the touch panel area for ensuring transmission of light from the light-emitting elements to the light-receiving elements along desired ligh detection paths therebetween, whereby the plurality of photodetection element pairs form a matrix of light detection paths in front of a display screen of the corrdiate input device so that a position of the touch panel area at which ligh detection paths are blocked is detected as a corrdinate input position of the display screen, the improvement comprising:
a planar portion disposed in parallel between the touch panel area of the frame and a the display screen, said planar portion having a given thickness and an inner side facing toward the touch panel area and an outer side facing toward the display screen, said planar portion having a recess formed in said outer side thereof protruding into the thickness of said planar portion for blocking spurous light entering said planar portion from propagating through said planar portion to the light-receiving elements.

2. A coordinate input device according to claim 1, wherein said filter includes side portions comprising a visible light-removing filter disposed in front of said light-emitting and -receiving elements.

3. A coordinate input device according to claim 1, wherein said planar portion is an operation panel disposed in front of the display screen of said display and adapted to transmit only desired light among various kinds of light emitted from said display screen.

4. A coordinate input device according to claim 1, wherein said filter comprises a visible light-removing filter disposed in front of said light-emitting and -receiving elements, and said planar portion as an operation panal disposed in front of the display screen of said display and adapted to be able to transmit only desired light among various kinds of light emitted from said display screen.

5. A coordinate input device according to claim 1, wherein said planar portion forms a part of said filter, said filter includes side portions disposed in front of the arrays of light-emitting and ligh-receiving elements, and said planar portion of said filter further has a projection formed at a position midway between the light-emitting elements and the light-receiving elements of the photodetection element pairs for preventing spurious light emitted from the light-emitting elements from being reflected from said planar portion toward the light-receiving elements.

6. A coordinate input device according to claim 1, wherein said planar portion is an operation panel of said coordinate input device mounted to said frame, and said recess is disposed on sides of said frame proximate the light-receiving elements.

* * * * *

UNITED STATES PATENT AND TRADEMARK OFFICE
CERTIFICATE OF CORRECTION

PATENT NO. : 4,751,379

DATED : June 14, 1988

INVENTOR(S) : HIROAKI SASAKI, KAZUO HASEGAWA, JUNICHI OUCHI

It is certified that error appears in the above-identified patent and that said Letters Patent is hereby corrected as shown below:

<u>Claims:</u>

Claim 1, col. 5, line 54, delete "ligh-emitting" and insert --light-emitting--;

Claim 1, col. 6, line 3, delete "ligh" and insert --light--;

Claim 1, col. 6, line 8, delete "ligh" and insert --light--;

Claim 1, col. 6, line 9, delete "corrdinate" and insert --coordinate--.

Claim 1, col. 6, line 13, delete "a";

Claim 1, col. 6, line 19, delete "spurous" and insert --spurious--.

Signed and Sealed this

Thirteenth Day of December, 1988

Attest:

DONALD J. QUIGG

*Attesting Officer*      *Commissioner of Patents and Trademarks*